Patented May 30, 1933

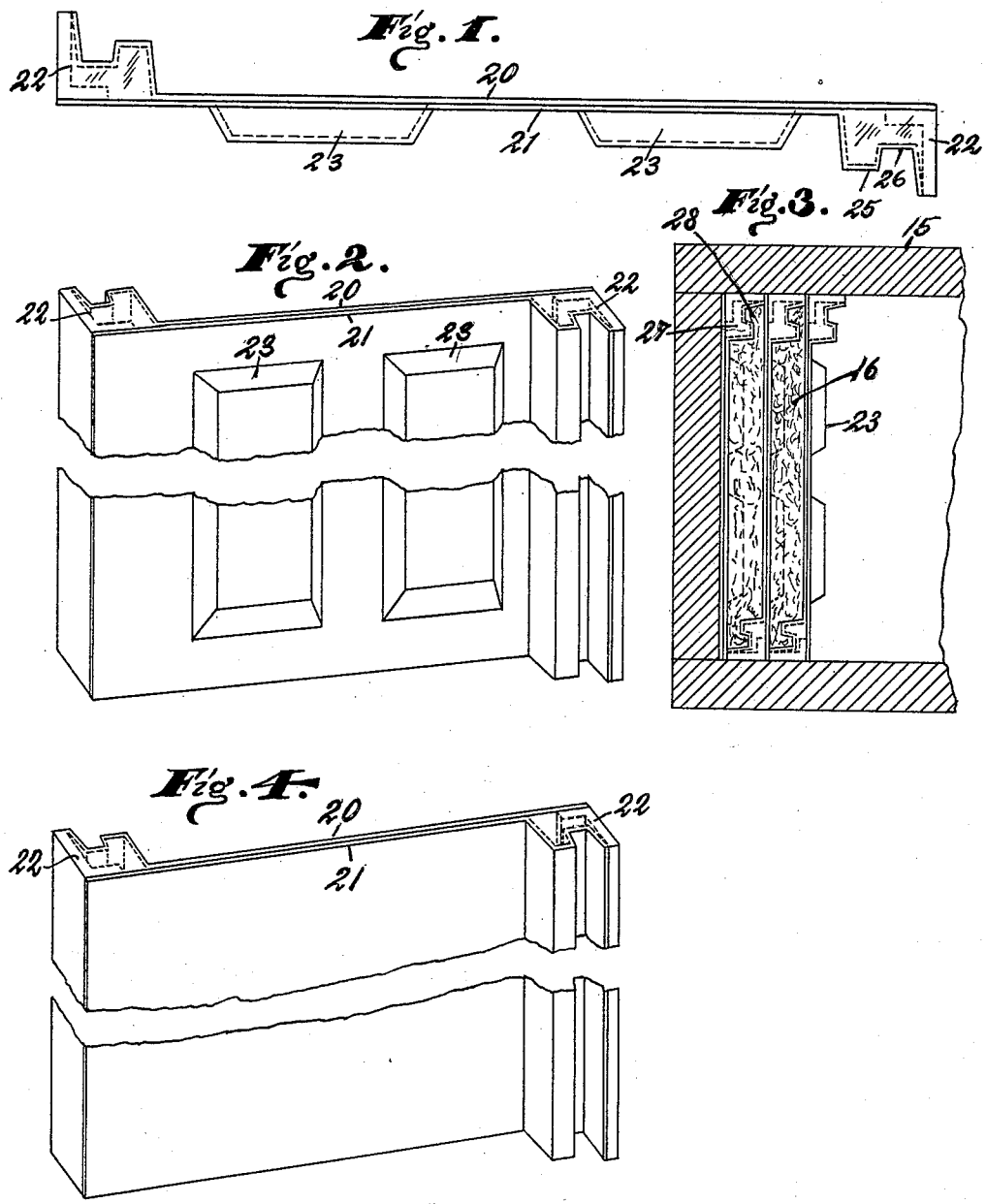

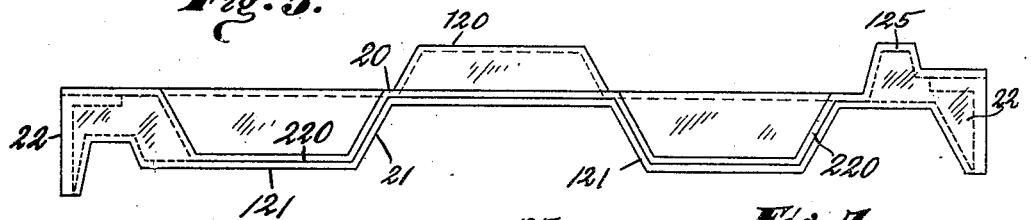
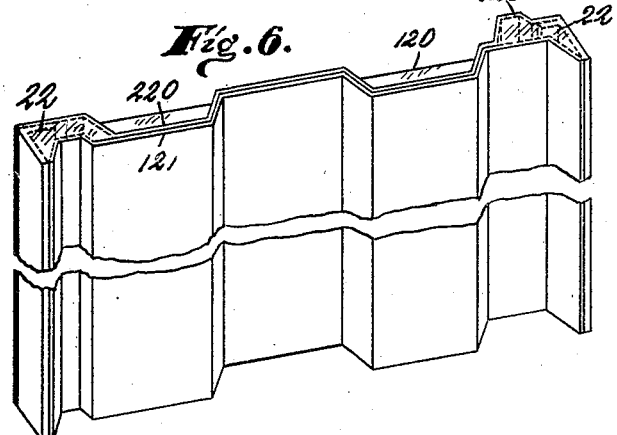
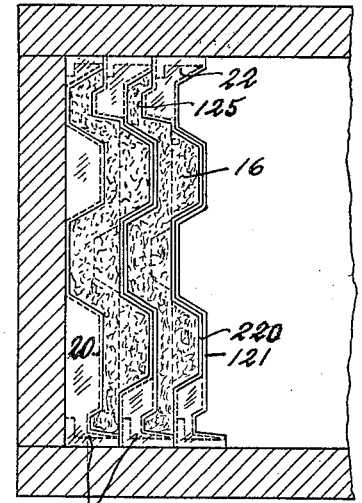
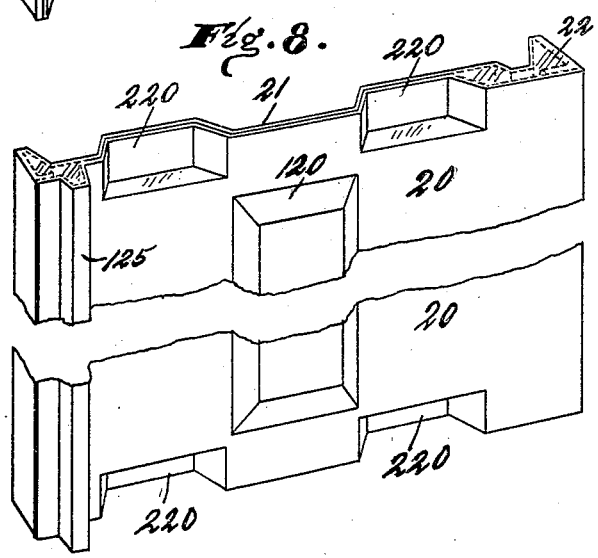

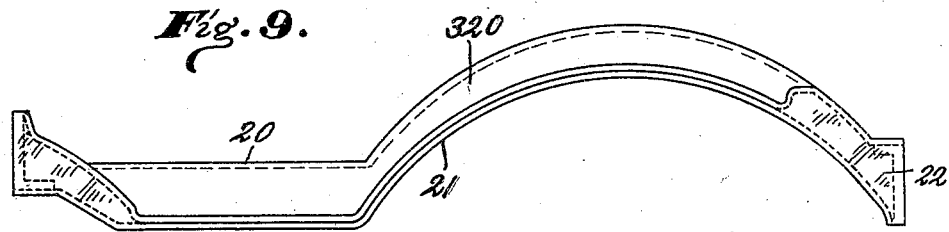
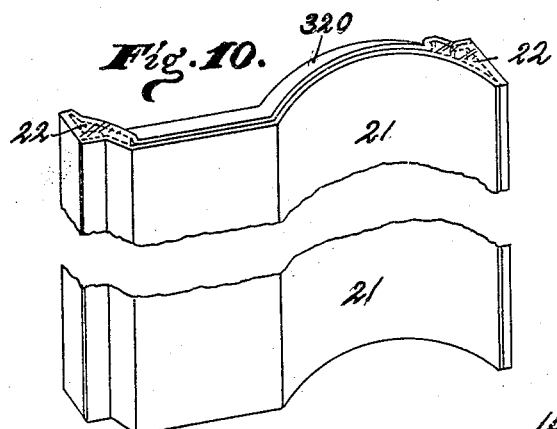
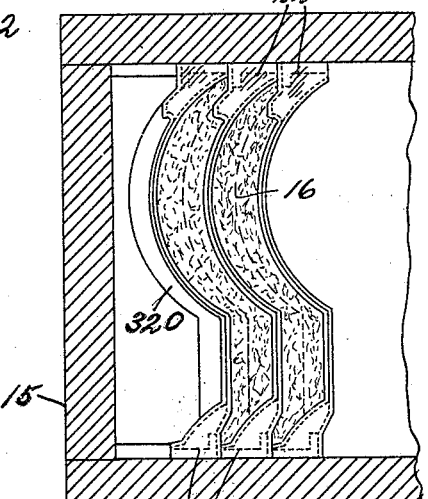
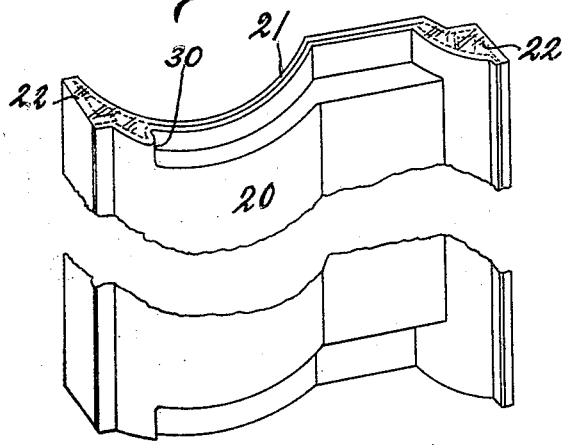

1,911,539

UNITED STATES PATENT OFFICE

OTTO WALTER, OF PERRYSVILLE, INDIANA

MOLD FOR MOLDING OBJECTS FROM PLASTIC MATERIAL

Application filed May 18, 1931. Serial No. 538,011.

This invention is a mold for molding objects from plastic material and is for improvements over that shown in my former application for mold for molding objects from plastic material, filed July 10, 1930, Serial Number 466,972 which has become Patent 1,846,290.

One feature of this invention consists in forming two sides of the mold plates of sheet metal and the two lateral edges of the mold plate having angle bars spot-welded or otherwise secured to the two side plates of the mold plate for spacing the mold plates apart in the mold box and reinforcing and greatly strengthening said mold plates and particularly the two lateral edges thereof.

Another feature of the invention consists in forming each mold plate relatively thin by bringing the sheet metal plates forming the two sides thereof flat against each other for most, or at least a large part, of the surface thereof. This is permitted to be done by reason of the reinforcing angle bars at the side edges.

The full nature of the invention will be understood from the accompanying drawings and the following description and claims.

In the drawings, Fig. 1 is a plan view of one form of said improved mold plate. Fig. 2 is a perspective of one side of said mold plate, the same being centrally broken away. Fig. 3 is a horizontal section through the mold box immediately above the mold plates with three mold plates therein and the box partly broken away. Fig. 4 is a perspective view of a modified form of said mold plate showing both sides plane and flat against each other, and being centrally broken away. Figs. 5, 6 and 7 are drawings corresponding to Figs. 1, 2 and 3, each showing a modified form of mold plate. Fig. 8 is a perspective view of the modified form of mold plate in Fig. 5 centrally broken away. Figs. 9, 10 and 11 are views similar to Figs. 1, 2 and 3, but showing a modified form of mold plate.

Fig. 12 is a perspective view of another modified form of mold plate centrally broken away.

As explained in my former application this invention contemplates the use of a mold box 15 in which mold plates, as here shown, are placed vertically adjacent each other and after the mold plates have been secured temporarily in the box, plastic material 16 is deposited through the open top of the box into the spaces between said mold plates and thereby desired objects are formed.

This molding apparatus was designed particularly for the purpose of making roofing shingles out of clay and the like, but the use of it is not limited to roofing shingles or to plastic clay as other articles may be made and other plastic material used.

After the shingles or other objects have been formed or molded by said mold and have been dried and cured, the mold box is allowed to set and the plastic material therein to dry until the tiles or other objects being molded have become cured; and then the mold box is inverted on a table and the mold plates and tiles readily removed and the mold plates again used for similar purposes.

The form of mold plate shown in Figs. 1, 2 and 3 consists of a sheet metal plate 20 forming one side of the mold plate, and a sheet metal plate 21 forming the other side thereof, and said two plates are placed flat against each other, as shown in Figs. 1 and 2, and their ends secured together by strong angle bars 22 that are spot-welded or otherwise secured between said plates 20 and 21 at their lateral edges.

The angle bars 22 are relatively thick and strong and, therefore, perform two important functions. One function is to serve as uniform spacers for spacing the mold plates from each other, as shown in Fig. 3. This enables the mold plates to be placed readily into the mold box, one behind the other, without particular pains being given to their location.

Another function of the angle bars 22 is that they serve to greatly strengthen and increase the durability of the mold plates in handling, in storage and in use. They stiffen the lateral edges of the mold plates and greatly strengthen them, as well as maintaining a uniform size for spacing purposes. By greatly strengthening the two lateral edges of the mold plates, as shown, the side plates 20 and 21 may be relatively thin and do not need to be reinforced. Thus in Figs. 1 and 2 the side plate 20 is flat throughout excepting one lateral edge, and in the modified form shown in Fig. 4 both plates 20 and 21 are alike flat throughout excepting one lateral edge. In the form shown in Figs. 1 and 2, the plate 21 is reinforced by the stamped extensions 23, as shown. These stamped extensions have two functions, one of which is to strengthen the plate 21 and another function is to diminish the weight of the shingle or other article 16 that is molded thereby. As seen in Fig. 3, it is noted that each shingle has two thin portions.

Each plate 20 and 21 has one lateral edge formed with a vertical extension 25 and a depression 26 adjacent the angle bar 22. This is to provide the roofing shingle with a groove 27 and a rib at 28 extending longitudinally thereof, whereby the shingles may overlap and interlock with each other when secured on the roof or other place for use.

In the form of mold plate shown in Fig. 1, these two peculiarly formed side portions extend in opposite directions and likewise the angle bars 22 extend in opposite directions.

In the modified form in Fig. 4, the two plates 20 and 21 are identical excepting that they are reversed when associated together in forming a mold plate. They make a thick, heavy and strong roofing shingle or the like, as shown in Fig. 3.

The modified form of mold plate shown in Figs. 5, 6, 7 and 8 differs from that shown in Figs. 1, 2 and 3 in the form of the side plates 20 and 21 and position of the angle bars 22. The side plate 20 has below its top on one side an extension 120 and near the top and bottom on the opposite side two extensions 22 and a rib forming extension 125 near one end. The side plate 21 has two extensions 121 from top to bottom. The extensions 220 and 121 in the two plates are adapted to interfit as shown in Fig. 5. This arrangement of the side plates makes a very strong mold plate.

In Fig. 5 the construction of the left hand end agrees with the construction of the left hand end in Fig. 1, as to the angle bars 22, excepting that the parts are reversed in position, the angle bars extending rearward in Fig. 1 and forward in Fig. 5. At the right hand end in Fig. 5 the angle bar is in the same position as the right hand end of Fig. 1, but the rib forming member is on the plate 20 instead of on the plate 21, as in Fig. 1 that is reversed.

In the assembled form of mold shown in Fig. 7, the first mold plate consists only of the plate 20, as shown in Fig. 5, but with the angle bar 22 associated therewith as spacers, but the remaining mold plates in Fig. 7 are the same as shown in Figs. 5 and 6.

In the modified form shown in Figs. 9 to 12 the plate 20 has a curved portion and a straight portion as shown in Fig. 9, with an inwardly extending portion 320 at both the top and bottom, as seen in Fig. 12.

The plate 21 is provided likewise with a curved portion and a straight portion substantially paralleling said portions in side plate 20. The angle bars 22 are reversely arranged with reference to each other the same as in Fig. 1.

The interlocking rib in the shingle or object to be formed is formed by the rib 30, as seen in Figs. 11 and 12, but these ribs do not extend for the full vertical dimensions of the mold plate, as they are located only at the top and bottom, as seen in Fig. 12.

I claim as my invention:

1. In a mold for molding objects from plastic material, a two-faced mold plate formed of two sheet metal plates adjacent each other, and angle bars between and secured to the lateral edges of said plates for securing them together in a unitary mold plate.

2. In a mold for molding objects from plastic material, a two-faced mold plate formed of two sheet metal plates adjacent each other, and L-shaped angle bars between and secured to the lateral edges of said plates for securing them together in a unitary mold plate.

3. In a mold for molding objects from plastic material, a two-faced mold plate formed of two sheet metal plates adjacent each other, the upper and lower portions of the side plates of said mold plate being substantially parallel with and adjacent to each other, and angle bars between and secured to the lateral edges of said plates for securing them together in a unitary mold plate.

4. A mold plate formed of two sheet metal plates with their sides secured together, each sheet having near one lateral edge vertically disposed rib-forming means and said rib forming means on the sheets being in diagonally opposite positions and extending in opposite directions, and reversely extending L-shaped angle bars secured to and between the lateral edges of said side plates.

5. A mold plate formed of two sheet metal plates with their sides secured together, each sheet being flat excepting that it has at one edge a rib-forming portion and said rib portions on the two metal plates being in reverse positions, and reversely extending L-shaped angle bars secured to and between the lateral edges of said side plates.

In witness whereof, I have hereunto affixed my signature.

OTTO WALTER.